United States Patent [19]

Neumann

[11] 3,977,272

[45] Aug. 31, 1976

[54] TRANSMISSION MECHANISM

[75] Inventor: Güenter J. Neumann, Sterling Heights, Mich.

[73] Assignee: Borg-Warner Corporation, Chicago, Ill.

[22] Filed: May 5, 1975

[21] Appl. No.: 574,483

[52] U.S. Cl. ............................... 74/759; 74/750 R; 74/801; 74/695
[51] Int. Cl.² ................... F16H 57/10; F16H 37/08
[58] Field of Search ............. 74/753, 759, 761, 763, 74/765, 767, 769, 750 R, 801, 695; 192/87.11, 87.15

[56] References Cited
UNITED STATES PATENTS

| | | | |
|---|---|---|---|
| 2,593,568 | 4/1952 | Kelbel | 74/759 |
| 3,631,947 | 1/1972 | Laing | 74/764 X |
| 3,678,783 | 7/1972 | O'Malley et al. | 74/759 |
| 3,701,623 | 10/1972 | Mori et al. | 74/695 |
| 3,747,727 | 7/1973 | Dach et al. | 192/87.11 X |
| 3,800,626 | 4/1974 | Koivunen | 74/695 |
| 3,802,294 | 4/1974 | Smirl | 74/759 |
| 3,858,698 | 1/1975 | Hause | 74/753 X |
| 3,859,872 | 1/1975 | Clauss, Jr. | 74/763 |
| 3,922,932 | 12/1975 | Maurice et al. | 74/801 X |

*Primary Examiner*—Benjamin W. Wyche
*Assistant Examiner*—Lance W. Chandler
*Attorney, Agent, or Firm*—Robert L. Zieg

[57] ABSTRACT

A compact transmission drive line arrangement incorporating a planetary mechanism comprised of three simple planetary gear sets interconnected having associated therewith two clutches and four brake mechanisms to provide four forward speed ratios and one reverse speed ratio. The clutches and the planetary mechanism are on opposite sides of the final drive gear which is connected to drive a parallel arranged differential and output shaft assembly. The planetary transmission is arranged such that all of the brake mechanisms are disposed radially of the planetary mechanism on the same side of the final drive.

5 Claims, 4 Drawing Figures

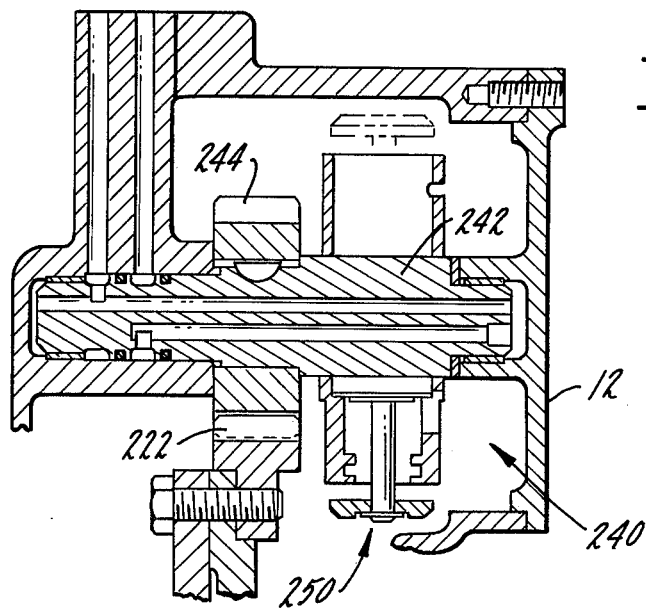
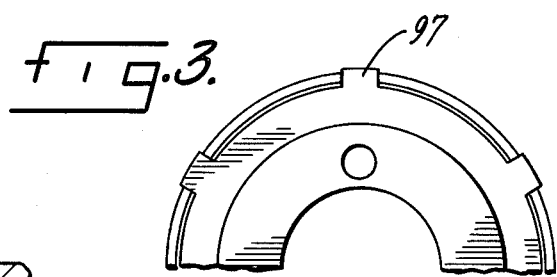
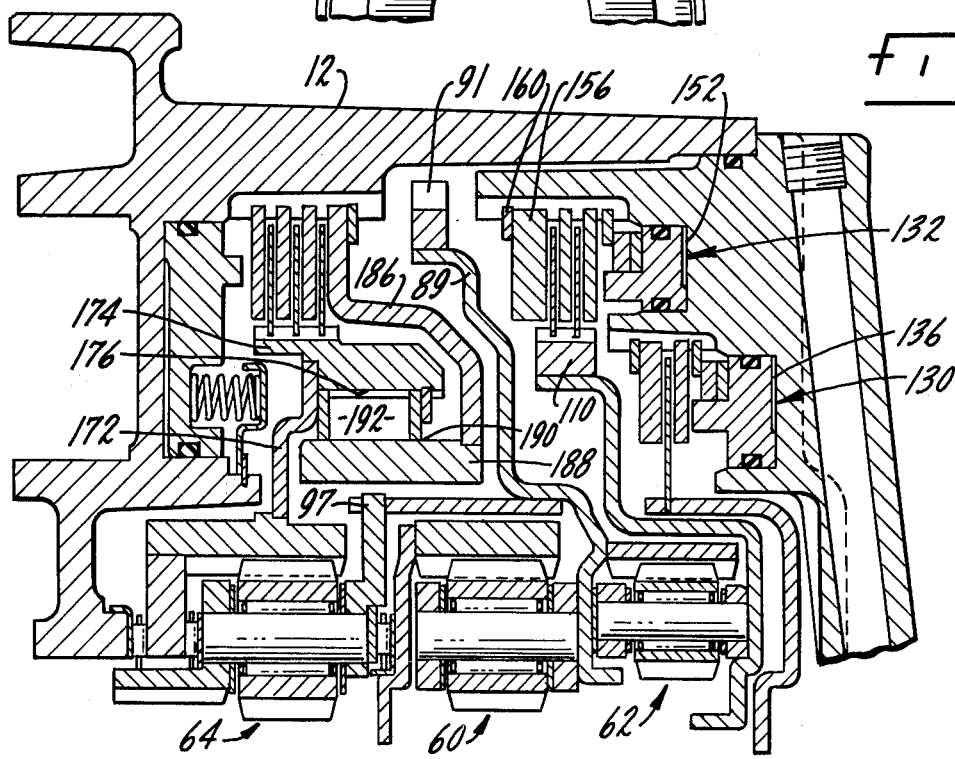

TRANSMISSION MECHANISM

SUMMARY OF THE INVENTION

It is known to have a planetary transmission arranged with a central output to provide for parallel arrangement between the transmission and the final drive line. The present invention, however, improves on those transmissions known in the prior art in that the clutches are the input elements to the planetary gear set and are on one side of the final drive line and the planetary gear trains are on the opposite side of the final drive line and all of the frictional elements and servomotors to actuate same are radially disposed with respect to the planetary transmission mechanism. In addition, the connections between the brake mechanisms and the transmission are made from sheet metal torque transmitting members which are formed in a nested relationship to one another to permit the radial arrangement of the brake mechanisms and provide a transmission of compact axial length since all brake mechanisms are within the axial limits of the planetary mechanism. In addition, a closure member is provided for the transmission casing which is adjacent the planetary mechanism and has a pair of annular bores of different diameters and which each partly define a brake servomotor, the bores being also axially offset to permit the axially compact arrangement.

BRIEF DESCRIPTION OF THE DRAWINGS

Referring to the drawings:

FIG. 1A is an enlarged cross-sectional view showing only the planetary transmission mechanism.

FIG. 2 is a sectional view showing the drive connection between the final drive gear and the hydraulic governor mechanism for the transmission; and FIG. 3 is a partial sectional view along lines 3—3 of FIG. 1.

DESCRIPTION OF THE PREFERRED EMBODIMENT

Figure 1:
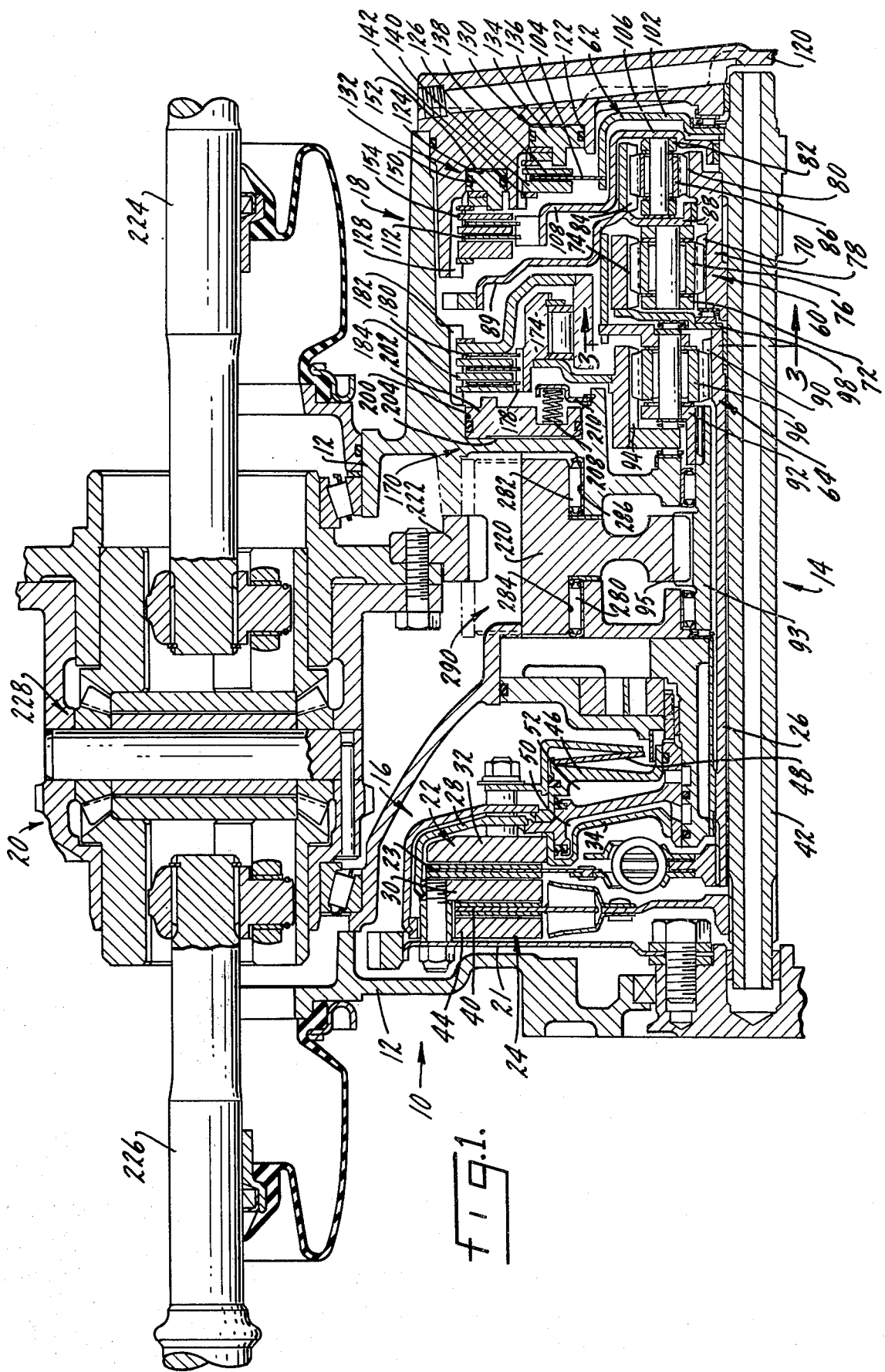
FIG. 1 is a cross-sectional view through a planetary transmission mechanism and final drive line arrangement.

Referring to FIG. 1 the transmission and differential combination is illustrated. As disclosed, the invention includes a transmission and final drive arrangement 10 mounted within a common housing 12. Incorporated within the housing 12 is an input clutch assembly 16, a planetary transmission assembly 18, and a final drive assembly 20.

The clutch assembly 16 has an input member 21 adapted to be driven by a vehicle engine. The clutch assembly 16 further includes a first clutch 22 and a second clutch 24. The first clutch 22 has a driven friction disc member 23 connected to drive an input shaft 26. The clutch 22 further includes an apply member 32, which is adapted to move into engagement with the disc 23 and against a backup plate 30. The member 32 is connected to a piston 34 which is operable to move apply member 32 into engagement with friction disc 23 against backup member 30 to engage clutch 22 and connect the input member 21 thereto to drive shaft 26. An axially stationary wall member 28 is provided which also is secured to the axially stationary backup member 30.

The clutch 24 includes a friction disc 40 which is adapted to engage with backup member 30 to drivingly connect the input member 21 to the second input shaft 42. An apply member 44 is provided which is connected to a piston 46. A Belleville spring 48 engages piston 46 to return it to its released position. The pistons 34 and 46 are part of the servomotor mechanism surrounding the stationary member 28. The stationary member 28 together with pistons 34 and 46 define fluid chambers 50 and 52 which may be supplied with fluid pressure to engage clutch 22 in a fluid chamber 52 which may be selectively filled with fluid pressure to engage clutch 22 or 24 respectively.

The clutch mechanisms 22 and 24, as described, are adapted to connect the output of the engine of the vehicle to input shaft 26 or input shaft 42 as will be later described.

The planetary transmission section 18 includes first, second and third planetary gear sets 60, 62 and 64 respectively. Planetary gear 60 includes a sun gear 70, a carrier member 72 and a ring gear member 74. Carried by the carrier member 72 are a plurality of planetary pinion gears 76 which intermesh with sun gear 70 and ring gear 74. Planetary gear set 62 includes a sun gear 80, a planetary carrier member 82 and a ring gear 84. A plurality of planetary pinion gears 86 are provided which intermesh with sun gear 80 and ring gear 84. Planetary gear set 64 includes a sun gear 90, a carrier member 92 and a ring gear member 94. Carrier member 92 carries a plurality of planetary pinion gears 96 which intermesh with sun gear 90 and ring gear 94.

Sun gears 70 and 80 are formed on a common hollow shaft member 78. Sun gear 90 is formed on the tubular shaft 26 and is joined to ring gear 74 of planetary gear set 60 by a connecting member 98. Planetary carrier member 92 is connected with ring gear 84 of planetary gear set 62 and planetary carrier member 72 of planetary gear set 60 by a torque transmitting member 88 formed of sheet metal. Also provided on a radially extending portion 89 of member 88 is a gear ring 91. The gear ring 91 serves as the parking brake since it is adapted to be engaged by a parking pawl (not illustrated). Carrier 92 is further connected to a tubular output shaft 93 which has formed thereon an output gear 95. The member 88 is joined to the carrier 92 by means of simple interlocking slat and tang arrangement shown at 97, and further illustrated in FIG. 3.

The input shaft 42 has a radially extending sheet metal cup-shaped torque transmitting member 102 drivingly connected thereto preferably by electron beam welding. This member is splined to a brake plate 104. The member 102 serves as a reaction member when the plate 104 is held stationary. Sun gear 78, being drivingly connected to the shaft 42, will be held stationary when the brake plate 104 is held stationary to serve as the reaction member for the gear set during particular ratios to be described.

A radially extending cup-shaped sheet metal torque-transmitting member 106 is provided drivingly connected, as for example by electron beam welding, to carrier member 82 for planetary gear set 62. Member 106 is cup-shaped to conform to member 102 and nest therewith and has a second offset radially extending portion 108 having attached thereto a brake member 110 which is drivingly connected to a plurality of brake plates 112. During particular ratios, brake plates 112 will be held stationary and member 108 and carrier 82 will serve as a reaction member for the gear set.

The casing 12 is enclosed on the right hand side, as illustrated in FIG. 1, by a large unitary end closure member 120 which has conveniently formed therein stepped annular bores 122 and 124. Annular bore 124 is of greater diameter than bore 122. The bores 122 and 124 are adapted to form hydraulic cylinders for servomotors for the brake mechanisms to hold members 102 and 106 stationary when the brakes are engaged. Axially extending toward the gear set and in the outer radial portion of bore 112 are a plurality of splines 126. Likewise in annular bore 124 are, axially extending toward the planetary gear set, splines 128 formed on the outer diameter of the bore 124. In general, a brake mechanism 130 is provided for the sun gears 70 and 80 to hold them stationary for particular ratios and a brake mechanism 132 is provided for carrier member 82 to hold same stationary for particular ratios.

Brake member 130 is comprised of an annular piston 134 received within annular bore 122 and forming therewith a fluid chamber 136. The brake 130 further includes a brake plate 138 splined on the outer diameter thereof to intermesh with splines 126 and a backup plate 140 serving as a reaction plate for the engagement of brake 130. Plate 140 is also splined to splines 126 and is held in place by a retaining ring 142. Thus, when fluid pressure is received within chamber 136 piston 134 will be moved to the left, as viewed in FIG. 1, and will move brake plate 138 axially into engagement with brake plate 104 and against backup plate 140 to hold member 102 and sun gear 78 stationary.

Brake mechanism 132 is comprised of a piston member 150 received within the annular bore 124 and forming therewith a fluid chamber 152 adapted to receive fluid pressure. Provided also are a plurality of annular plates 154 which are splined on the external diameter thereof to mesh with internal splines 128 formed in member 120. Also provided is a backup plate 156 splined to splines 128 and held in place by a retaining ring 160. When fluid pressure is received within chamber 124 the piston 150 will move to the left to move plates 154 into engagement with plates 112 and backup plate 156 to hold member 106 stationary and thereby hold carrier 82 stationary to serve as a reaction member for a particular ratio in the planetary gear set.

It is important to point out that conveniently the brake mechanism 130 and 132 are formed by providing a pair of annular bores within a single end closure member 120 and the annular bores are offset axially, as well as radially, as shown in FIG. 1. The bore and cooperating brake member 132 are displaced axially toward the output gear 95 and outwardly from bore 122 and brake member 130 whereby brake members 102 and 106 may be nested to provide adequate space to contain the friction elements for the transmission while at the same time providing minimum axial length of the transmission, to fit the transmission in a limited axial space. As will be apparent all of the brake members for the planetary mechanism 18 are within the axial limits of the planetary gear sets themselves and thus minimum axial length of the transmission is provided.

Also provided within casing 12 is a brake mechanism 170 which is a one-way and two-way brake mechanism. Connected to the ring gear member 94 of the planetary gear set 64 is, as for example by electron beam welding, a radially extending portion 172 having thereon an annular member 174 which has an inner race 176 on the internal diameter thereof and has splines 178 formed on the external diameter thereof. Connected to the splines are a series of brake plates 180 which are annular in shape and adapted to be frictionally engaged. Provided on an internal diameter of casing 12 are axially extending splines 182 to which are splined a series of brake plates 184 adapted to be engaged with brake plates 180 to hold member 174 stationary and thereby ring gear 94 stationary. Also splined to the splines 182 is a torque transmitting member 186 which is cup-shaped having an annular reaction member 188 secured thereto and having an outer race 190 formed thereon. A one-way clutch mechanism 192 is provided which may consist of rollers, for example, between races 176 and 190. Since the member 188 is splined to the casing 12 through member 186, member 188 serves as a reaction member for the one-way brake mechanism 192 such that the brake mechanism 192 will always be effective to hold the member 174 against rotation in one direction of rotation and whereby by engagement of brake 170 to engage brake plates 180 and 184 the member 174 will be held against rotation in either direction to comprise to two-way brake function of the brake 170. Brake 170 further includes a relatively large piston 202 slidably mounted in a bore 200 and forms therewith an annular fluid chamber 204. The piston 202 will move to the right as viewed in FIG. 1 when fluid pressure is received within chamber 204 to engage brake plates 180 with brake plates 184 to provide the two-way brake function. A series of coil springs 208 are provided which are held in place by a retainer member 210, which return piston 202 to the left after fluid pressure is exhausted.

As will be apparent, the transmission 14 is a transmission of the center output type, that is, the output gear 95 is in the center of the transmission disposed between planetary gear set 18 and the input clutch section 16. This type of transmission is particularly adapted for front engine front drive or rear engine rear drive installations wherein the engine and transmission are on parallel axis to the differential and axle drive shafts. As viewed in FIG. 1, the output gear 95 is shown in engagement with a second output gear 220 which is adapted to engage a differential ring gear 222 to drive the axles 224 and 226 of the vehicle through the differential 228. As will be apparent, gear 95 could be designed as a sprocket for an installation wherein a chain drive is to be utilized, in which case ring gear 222 would also be a chain sprocket.

As viewed in FIG. 2, and also driven by the ring gear 222, is a governor mechanism 240 for the hydraulic control system of transmission 14. The governor mechanism is offset from the transmission within the casing 12 such that sufficient room may be provided for the governor 240. The governor mechanism comprises a short shaft 242 rotatably mounted within casing 12 having a drive gear 244 thereon in engagement with ring gear 222. Radially fixed to the shaft 242 which is driven by the gear 244 is the governor valve 250. Since ring gear 222 directly drives the vehicle wheels, the governor mechanism 250 is driven in accordance with vehicle speed whereby it can provide a control pressure to the transmission which varies in accordance with vehicle speed. The governor mechanism 250 may be of any of the known types as for example as disclosed in U.S. Pat. Nos. 3,117,464 and 3,631,872 and will not be described in detail.

As can be seen in FIG. 1, the output gear 220 has formed therewith two bearing journals 280 and 282 on either side thereof. These journals are received within appropriate bores 284 and 286, respectively, within the casing 12. The gear 220 itself being entirely disposed in a cavity 290 which is formed between the clutch section 16 and the planetary mechanism 18 whereby an extremely compact structure of transmission is provided and in addition a very rigid output mechanism is provided able to handle the torque forces involved easily due to the way in which the output gear 220 is mounted within the pocket 290 and journalled in the casing 12 at two points.

The operation of the transmission 14 is as follows: A vehicle engine (not illustrated) is connected to drive member 21 and thereby the members 30 and 44 are rotated by the engine. Not illustrated in the present application is a fluid control system for the transmission mechanism which may be of a known type to handle a four-speed automatic transmission such as disclosed in U.S. Pat. No. 3,688,608 of common assignee. During the automatic shifting phase of the transmission, when first gear is to be established when the vehicle is starting from stop, fluid pressure will be provided to chamber 50 to move apply member 22 to the left to engage clutch plate 24 with member 30 and thus drive input shaft 26. Input shaft 26 will drive sun gear 90 and during the automatic phase the rotation of the elements of the gear set 64 is such that one-way brake 192 will hold ring gear 94 stationary, thus providing a reduced forward drive through the carrier 92 of gear set 64 and output shaft 93, output gear 95, second output gear 220 and ring gear 222 to drive the vehicle axis.

When the transmission shifts to second ratio, clutch 22 remains engaged and fluid pressure is supplied to chamber 124 to engage brake 132. This holds planetary carrier 82 stationary and with a driving input through shaft 26 and thereby ring gear 74, a reduced forward drive of ring gear 84 of planetary gear set 62 will take place thus driving output shaft 93 at a reduced drive ratio less than that provided in first speed.

When an automatic shift is made to third-speed ratio, clutch 22 remains in engagement and brake 130 is engaged by supplying fluid pressure to chamber 136. When fluid pressure is released from chamber 124 releasing brake 132, with brake 130 held, sun gears 78 will be held stationary and with an input through ring gear 74, a reduced forward drive of the carrier member 72 and thus output shaft 93 is provided which is of a drive ratio of lesser amount than that of second speed.

When fourth ratio is to be established, again clutch 22 remains engaged, fluid pressure is exhausted from chamber 136 to release brake 130, and fluid pressure is supplied to chamber 152 to move member 44 axially to engage friction plate 40 thereby engaging clutch 24, such that both clutches 22 and 24 are engaged thus locking up planetary gear mechanism 18 and providing a one to one drive ratio to output gear 95. As will be seen from the above, during all forward ratios the clutch 22 remains engaged thus simplifying the shifts made since only one element is released and one element engaged during each ratio change.

In addition to the first ratio established during the automatic phase of shifting in which one-way brake 192 holds ring gear 94 engaged, the operator may manually select first ratio and if this is done, fluid pressure will be supplied to chamber 204 to move piston 202 and engage brake plates 184 and 180 of brake 170 to hold the ring gear 94 against rotation in both directions to provide a two-way first ratio drive through the transmission.

Reverse ratio is established by engaging clutch 24 and brake 170. With clutch 24 engaged and the sun gears 78 thus being driven and the ring gear 94 acting again as the reaction member, a reverse drive of carrier 92 and thus output shaft 93 will be provided.

Appearing below is a table showing the ratios obtained in the various speeds of a preferred embodiment of the transmission described herein:

| Speed | Ratio |
|-------|-------|
| 1st | 3.50 |
| 2nd | 2.20 |
| 3rd | 1.45 |
| 4th | 1.00 |
| Reverse | 4.56 |

The various features of the invention have been particularly shown and described, however, it should be obvious to one skilled in the art that modifications may be made therein without departing from the scope of the invention.

I claim:

1. An automotive transmission including a pair of engageable input clutches, a planetary mechanism adapted to receive a driving input from one or both of said clutches when engaged, an output gear between said clutches and said planetary mechanism, said output gear connected to be driven by said planetary mechanism, said planetary mechanism being comprised of three planetary gear sets with at least one brake mechanism for each of said planetary gear sets and radially disposed with respect to its gear set, at least two of said brake mechanisms including torque transmitting members connecting the brake member to the planetary gear sets, said torque transmitting members being of cup-shape and assembled in nesting arrangement with respect to one another, whereby said brake mechanisms are located wholly within the axial dimensions of the planetary mechanism.

2. An automotive transmission as claimed in claim 1 wherein a third brake mechanism will provide either a one-way or a two-way drive through said gear set and includes a one-way brake mechanism radially disposed with respect to said planetary mechanism.

3. An automotive transmission as claimed in claim 1 wherein said two brake mechanisms are friction disc type brakes.

4. A power transmission device including a pair of engageable input clutches, a planetary mechanism adapted to receive a driving input from one or both of said clutches when engaged, an output gear between said clutches and said planetary mechanism, said output gear connected to be driven by said planetary mechanism, said planetary mechanism being comprised of a plurality of planetary gear sets with at least one brake mechanism for each of said planetary gear sets radially disposed with respect to its gear set, at least two of said brake mechanisms including torque transmitting members connecting the brake member to the planetary gear sets, a casing enclosing said power transmission device and including a closure member disposed adjacent said planetary mechanism, said closure member including a pair of annular bores of different diameters, one of said annular bores being axially offset with respect to the other, said bores each partly defining a servomotor and one of said brake mechanisms adjacent each said servomotor, a torque-transmitting member for each brake mechanism connecting the brake mechanism with one of said planetary gear sets, said torque transmitting members being cup-shaped and nested so as to match the axial offset of said bores whereby all brake mechanisms for said transmission are wholly disposed within the axial dimensions of said planetary mechanism.

5. A power transmission as claimed in claim 4 wherein brake plates with splines on the outer edge thereof are provided in each brake mechanism, said closure member having mating splines formed in the outer diameter portion of each of said bores, said brake plate splines being engaged with said mating splines whereby a connection between said closure member and said torque transmitting members is provided when said brake mechanisms are activated.

* * * * *